(12) United States Patent
Schmid et al.

(10) Patent No.: US 8,301,345 B2
(45) Date of Patent: Oct. 30, 2012

(54) METHOD FOR TRANSMITTING AN ACTIVATION DECISION FOR AN ACTUATOR SYSTEM FROM A FIRST TO AT LEAST ONE SECOND CONTROL UNIT; FIRST CONTROL UNIT FOR A VEHICLE; SECOND CONTROL UNIT FOR A VEHICLE; DEVICE FOR TRANSMITTING AN ACTIVATION DECISION FOR AN ACTUATOR SYSTEM FROM A FIRST TO A SECOND CONTROL UNIT

(75) Inventors: Michael Schmid, Kornwestheim (DE); Holger Denz, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 572 days.

(21) Appl. No.: 12/300,581

(22) PCT Filed: Jul. 10, 2007

(86) PCT No.: PCT/EP2007/057021
§ 371 (c)(1),
(2), (4) Date: Nov. 12, 2008

(87) PCT Pub. No.: WO2008/022843
PCT Pub. Date: Feb. 28, 2008

(65) Prior Publication Data
US 2009/0125192 A1 May 14, 2009

(30) Foreign Application Priority Data

Aug. 24, 2006 (DE) .................. 10 2006 039 709

(51) Int. Cl.
*B60R 22/00* (2006.01)
(52) U.S. Cl. .............................. 701/45; 701/1; 340/436
(58) Field of Classification Search .................. 701/45, 701/1, 41; 180/282; 280/735
See application file for complete search history.

(56) References Cited

U.S. PATENT DOCUMENTS

| 5,964,816 | A | 10/1999 | Kincaid | |
|---|---|---|---|---|
| 6,842,684 | B1 * | 1/2005 | Kade et al. | 701/70 |
| 7,546,192 | B2 * | 6/2009 | Mizokoshi | 701/45 |
| 7,606,647 | B2 * | 10/2009 | Seikai et al. | 701/45 |
| 7,689,361 | B2 * | 3/2010 | Hijikata | 701/301 |
| 7,832,762 | B2 * | 11/2010 | Breed | 280/735 |
| 7,904,223 | B2 * | 3/2011 | Le et al. | 701/46 |

(Continued)

FOREIGN PATENT DOCUMENTS
WO 2006/081902 8/2006

OTHER PUBLICATIONS

International Search Report of Application No. PCT/EP2007/057021, dated Oct. 1, 2007.

*Primary Examiner* — Ruth Ilan
*Assistant Examiner* — Karen A Beck
(74) *Attorney, Agent, or Firm* — Kenyon & Kenyon LLP

(57) ABSTRACT

A device and a method for transmitting an activation decision for an actuator system from a first to at least one second control unit is provided, the second control unit activating the actuator system as a function of at least two messages from the first control unit.

13 Claims, 2 Drawing Sheets

U.S. PATENT DOCUMENTS

| | | | |
|---|---|---|---|
| 2004/0024832 A1* | 2/2004 | Mizokoshi | 709/208 |
| 2004/0030477 A1* | 2/2004 | Gerdes | 701/48 |
| 2004/0153217 A1* | 8/2004 | Mattes et al. | 701/1 |
| 2008/0040004 A1* | 2/2008 | Breed | 701/45 |
| 2008/0129475 A1* | 6/2008 | Breed et al. | 340/438 |
| 2008/0238075 A1* | 10/2008 | Bullinger et al. | 280/806 |
| 2009/0125192 A1* | 5/2009 | Schmid | 701/45 |
| 2010/0042294 A1* | 2/2010 | Lich et al. | 701/41 |
| 2010/0235056 A1* | 9/2010 | Schuetze | 701/45 |
| 2011/0035115 A1* | 2/2011 | Schumacher | 701/45 |
| 2011/0144866 A1* | 6/2011 | Maier | 701/45 |
| 2012/0004811 A1* | 1/2012 | Becker et al. | 701/45 |

\* cited by examiner

METHOD FOR TRANSMITTING AN ACTIVATION DECISION FOR AN ACTUATOR SYSTEM FROM A FIRST TO AT LEAST ONE SECOND CONTROL UNIT; FIRST CONTROL UNIT FOR A VEHICLE; SECOND CONTROL UNIT FOR A VEHICLE; DEVICE FOR TRANSMITTING AN ACTIVATION DECISION FOR AN ACTUATOR SYSTEM FROM A FIRST TO A SECOND CONTROL UNIT

FIELD OF THE INVENTION

The present invention relates to a method for transmitting an activation decision for an actuator system from one first control unit to at least one second control unit; a first control unit; a second control unit; and a device for transmitting an activation decision for an actuator system from a first to at least one second control unit.

BACKGROUND INFORMATION

A short signal transmission between two evaluation units is discussed in EP 866 971 B1. In the process, data relating to failed components and failed functions are exchanged via the line.

SUMMARY OF THE INVENTION

In contrast, the method according to the present invention for transmitting an activation decision for an actuator system from a first control unit to at least one second control unit, and the first control unit for a vehicle, and the second control unit for a vehicle, and the device for transmitting a first activation decision for an actuator system from a first to at least one second control unit respectively have the advantage that an activation decision is transmitted and that this transmission is made particularly secure by the fact that the activation of the actuator system takes place as a function of at least two messages from the first control unit.

That is, the data transmission is made up of at least two messages from the first control unit to the at least second control unit. This leads to a particularly secure and reliable data transmission for a message so important that it must be transmitted in the most reliable manner possible. Consequently, it is possible that an evaluation that takes place in the first control unit and leads to an activation decision for the second control unit, so that this activation decision is able to be transmitted without any problems. In particular, it is not necessary for the second control unit to perform a separate evaluation. Of course, the activation may also be a function of additional parameters that are evaluated in the second control unit.

For example, the first control unit is a control unit for activating a personal protective arrangement and the second control unit for activating an electronic stability program or a brake system. In the course of combining such safety functions, it may be helpful to additionally activate the functions of the electronic stability program or the brake system in a crash phase to minimize the consequences of the accident. The design approach according to the exemplary embodiments and/or the exemplary methods of the present invention prevents an activation from mistakenly taking place.

The measures and the refinements set forth in the dependent claims make it possible to advantageously improve the device specified in the independent claims, the method specified in the independent claims, and the control units specified in the independent claims.

It is particularly advantageous that the first and the second control unit, as specified above, activate different actuator systems, the personal protective arrangement (airbags, belt-tighteners, roll bars), or an electronic stability program, or a brake system. Thus, synergistic effects among these vehicle systems are optimally utilized.

Advantageously, the first message sets the second control unit in an active state, and the activation of the actuator system by the second control unit is then brought about only by the second message, provided the control unit is in the active state. This active state does not persist indefinitely, but rather only for a predefined period of time, for example, 20 ms. Afterward, if the second message has arrived by then, the second control unit is returned to the inactive state.

Alternatively, it is possible for the activation to take place only if the second control unit receives at least two messages, the second one of those messages having been generated by a third message from the second control unit to the first control unit. That is, after the second control unit has received the first message, a request is sent to the first control unit to confirm this fact. In return, the first control unit then sends its second message. The transmission of the activation decision is thus safeguarded by this question-answer behavior.

Exemplary embodiments of the present invention are illustrated in the drawings and explained in greater detail in the following description.

DETAILED DESCRIPTION

Figure 1:
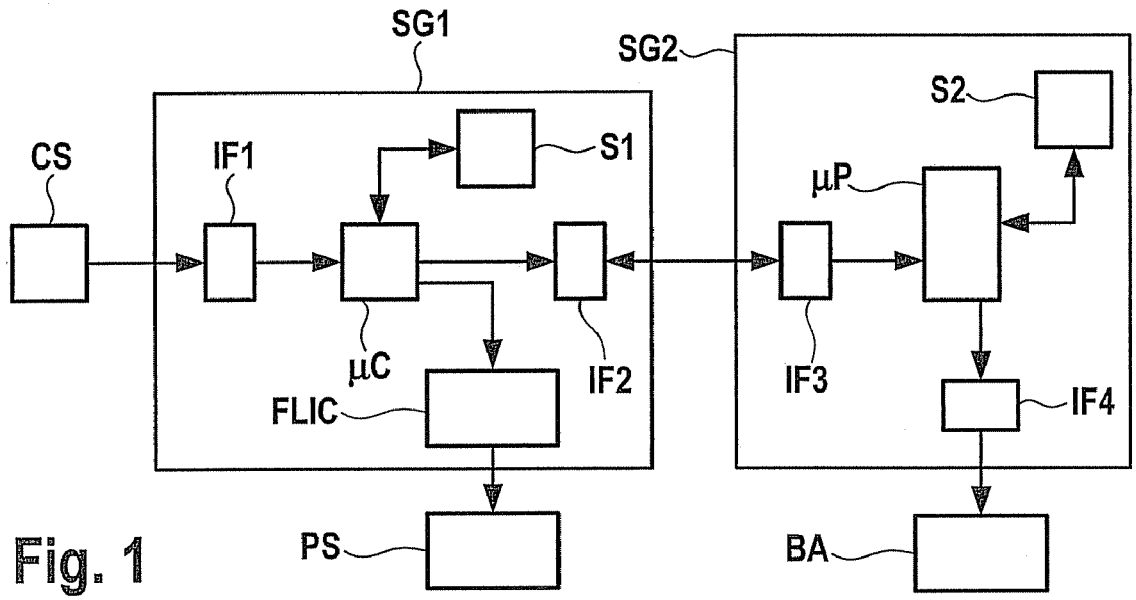
FIG. 1 shows a block diagram of the device according to the present invention having the control units according to the present invention.

FIG. 1 explains the structure of the device according to the present invention and the control units according to the present invention to the extent that it is necessary to understand the present invention. That is, components necessary for the operation, but not necessary for understanding the present invention have presently been omitted for the sake of simplicity. A first control unit SG1 has as a central element a microcontroller μC, which is used as an evaluation circuit. Microcontroller μC, which may also be replaced by other processor types or ASICs or discretely structured evaluation circuits, is connected via a data input/output to an assigned memory S1 that enables a permanent or volatile storage of data. Microcontroller μC receives data from a remote crash sensor system CS via an interface IF1. Additionally, a crash sensor system may exist within control unit SG1. An environment sensor system and a sensor system for detecting passengers may also exist. Crash sensor system CS has acceleration sensors at the front of the vehicle and on the sides of the vehicle, and may additionally have pressure sensors in the area of the side sections of the vehicle to detect a side impact as quickly as possible. A structure-borne noise sensor system may also be used as a crash sensor system CS. Other contact sensors are also possible. In addition to a radar and ultrasonic sensor system, a video sensor system or a lidar sensor system or a photonic mixing device may also be used as environment sensors. The acceleration sensor system and the pressure sensor system are normally constructed micromechanically. That is, pressure modifications and accelerations are expressed in a movement of a micromechanically produced element, which movement is then often expressed in a change in capacity. This change in capacity is transformed into a voltage, which is finally digitized, and thus able to be transmitted as a datum to interface IF1 in control unit SG1. The transmission between interface IF1 and microcontroller μC normally takes place via the serial peripheral interface bus, abbreviated SPI. As a function of these sensor data, microcontroller μC uses an activation algorithm, which it loads from memory S1, to ascertain whether an activation of a personal protective arrangement PS and of brake assist system BA shall take place. If microcontroller μC then arrives at an activation decision, then it activates, likewise via the SPI bus, an ignition circuit FLIC that brings about a supply of power to the corresponding personal protective arrangement PS. For this purpose, ignition circuit FLIC has power switches that allow the ignition current to reach the personal protective arrangement. The ignition current is normally obtained from an energy reserve, that is, from one or more capacitors or from the vehicle battery.

However, the activation decision is in this case additionally transmitted in the form of at least two messages from microcontroller μC to a control unit SG2 via an additional interface IF2, so that control unit SG2 is able to accordingly activate a brake assist system BA. Interface IF2 may be a CAN controller, as may interface IF3, so that a CAN bus creates the connection between the two control units SG1 and SG2. However, other data transmission methods are also possible, like a point-to-point connection or other bus systems. Interface IF3 in control unit SG2 relays the messages to microprocessor μP in control unit SG2. It is also possible to use a microcontroller or other evaluation circuits as well, instead of a microcontroller/processor μP.

Microcontroller/processor μP also uses a memory S2 to store data permanently or in a volatile manner, or to load data from the permanent memory. If the at least two messages from control unit SG1 have reached control unit SG2, microprocessor μP activates brake assist system BA via interface IF4.

This activation decision from control unit SG1 may also be transmitted to several control units. In addition to this activation decision, control unit SG2 may also use other self-evaluated data to decide whether and how the corresponding actuator system, in this instance brake assist system BA, shall be activated.

Figure 2:
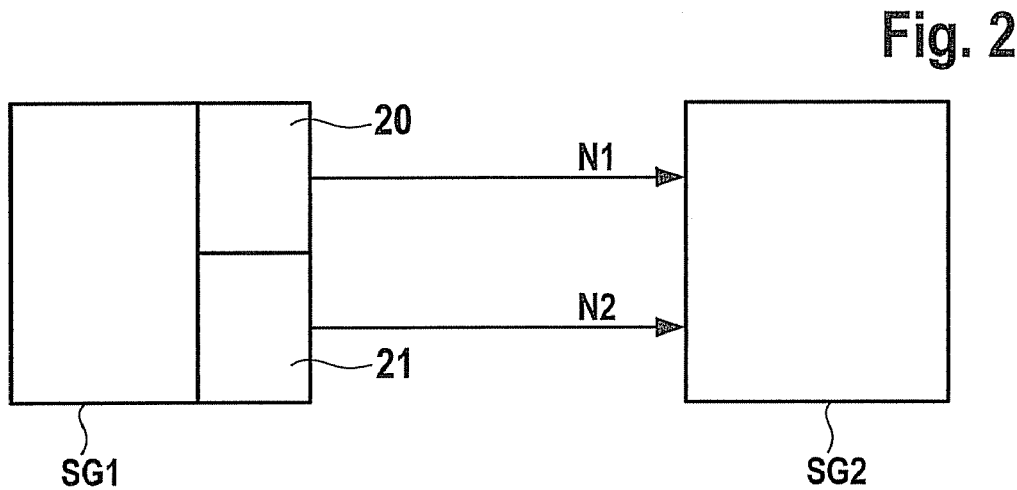
FIG. 2 shows a first exemplary embodiment of the data transmission.

FIG. 2 explains in a first exemplary embodiment one possible transmission of the activation decision using at least two messages. At control unit SG1, a message N1, which sets control unit SG2 into an active state, is transmitted from a block 20, which is a software element in this instance. After a predefined time, software element 21 generates message N2, which contains the actual activation decision. When it receives message N2, control unit SG2 checks to see whether the time for which control unit SG2 is allowed to remain in the active state has already elapsed or not. If it has not elapsed and message N2 contains the activation decision, then actuator system BA is activated. Instead of two messages, three or a plurality of messages may also be used, which control different phases of the activation of control unit SG2. Software elements 20 and 21 run as modules on microcontroller μC. They are embedded in the overall software of microcontroller μC.

Figure 3:
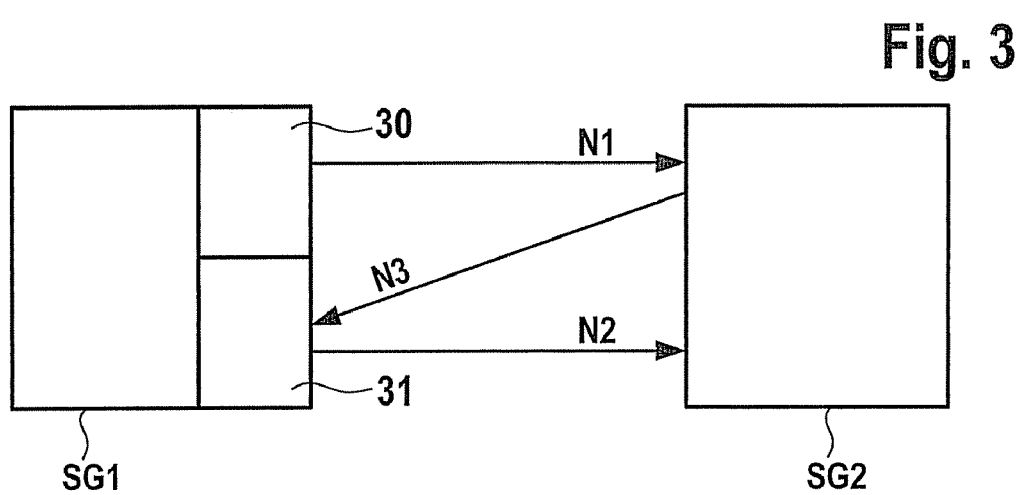
FIG. 3 shows a second exemplary embodiment of the data transmission.

This applies also to the exemplary embodiment as shown in FIG. 3. Control unit SG1 has two software modules 30 and 31 that respectively generate the first and second message. In this instance, software module 30 transmits message N1, which already contains the activation decision. Control unit SG2 now uses a separate message N3 to request a confirmation of this activation decision from control unit SG1. Then software module 31 transmits to control unit SG2 a confirmation of this activation decision. Here too, a time elapses between the arrival of messages N1 and N2, which is not permitted to exceed a specific predefined value. If this value is exceeded, no activation occurs. In this instance too, this method could be further secured by additional confirmations. It is also possible to combine the exemplary embodiments shown in FIG. 2 and FIG. 3.

Figure 4:
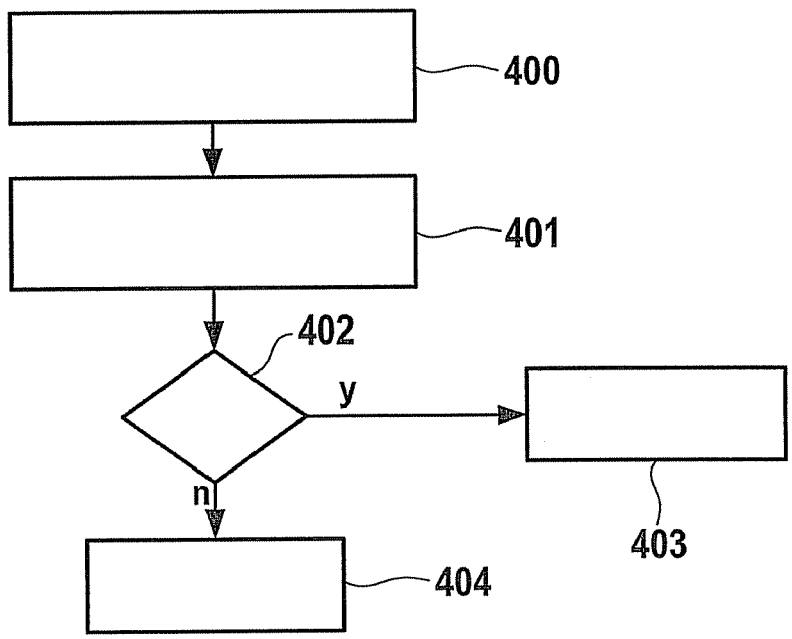
FIG. 4 shows a first flow chart.

FIG. 4 explains in a flow chart the sequence of the first exemplary embodiment as shown in FIG. 2. In method step 400, an activation decision that was formed in control unit SG1 is available for control unit SG2. In method step 401, message N1 is then transmitted to control unit SG2 with the request to set itself in an active state. In method step 402, a check is done to see whether a second message N2 has arrived within a maximum period of time δt. If this message has not arrived or another message has not, then a jump is made to method step 404 and control unit SG2 is set back to an inactive state. However, if message N2 was received by control unit SG2 within time δt, brake assist system BA is activated in method step 403. Alternatively, as shown above, other actuators may be activated.

Figure 5:
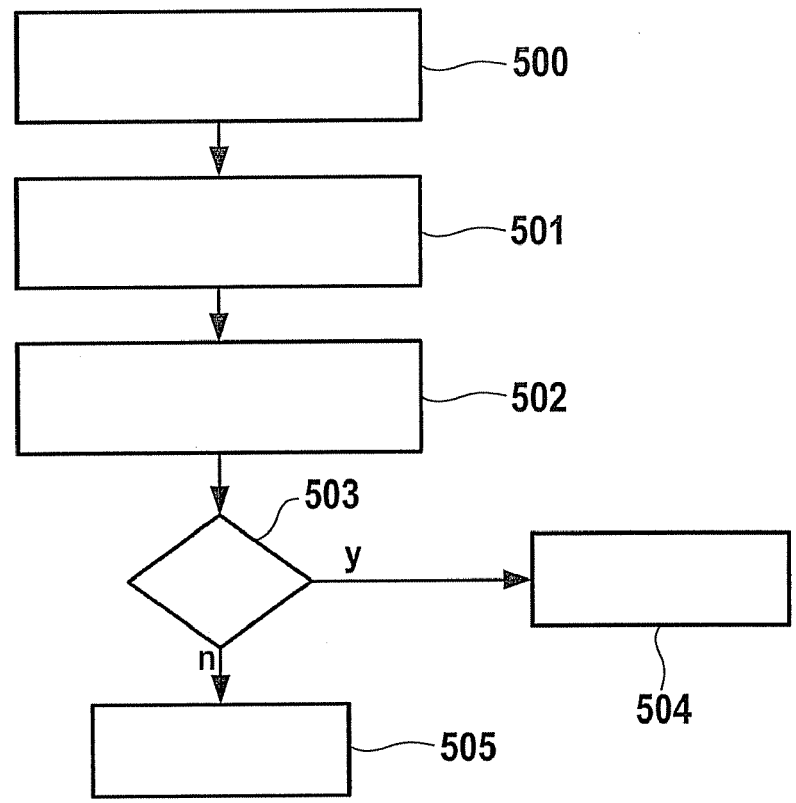
FIG. 5 shows a second flow chart.

FIG. 5 illustrates in an additional flow chart the sequence of the method according to the present invention according to the second exemplary embodiment. In method step 500, the activation decision is formed in control unit SG1 as a function of the sensor signals of crash sensor system CS. Then, in method step 501, message N1 is transmitted to control unit SG2 with the content that an activation of brake assist system BA is to take place. Control unit SG2 then transmits a request N3 to control unit SG1 to confirm message N1. In method step 503 a check is then done to see whether message N2 arrives at control unit SG2 as confirmation within time δt. If this message N2 was detected within time δt at control unit SG2, then the corresponding actuator system, here of brake assist system BA, is activated in method step 504. If message N2 did not arrive within time δt or another message has not, then the method according to the present invention is concluded in method step 505.

What is claimed is:

1. A method for transmitting an activation decision, the method comprising:
   transmitting an activation decision for an actuator system from a first control unit to at least one second control unit, wherein the activation decision is made in the first control unit and is comprised of at least two messages; and
   activating the actuator system as a function of the at least two messages that includes the activation decision from the first control unit, wherein the second control unit is set to an active state by the first message and the second message brings about the activation of the actuator system if the second control unit has been set to the active state.

2. The method of claim 1, wherein the first and the second control unit respectively activate different actuator systems.

3. The method of claim 1, wherein the activation takes place when the second control unit receives at least two messages, the second message having been generated by a third message from the second control unit to the first control unit.

4. The method of claim 1, wherein the first and the second control unit respectively activate different actuator systems, wherein the second control unit is set to an active state by the first message and the second message brings about the activation of the actuator system if the second control unit has been set to the active state, and wherein the activation takes place when the second control unit receives at least two messages, the second message having been generated by a third message from the second control unit to the first control unit.

5. A method for transmitting an activation decision, the method comprising:
transmitting an activation decision for an actuator system from a first control unit to at least one second control unit; and
activating the actuator system as a function of at least two messages from the first control unit;
wherein the first control unit activates a personal protective arrangement and the second control unit activates at least one of an electronic stability program and a brake system.

6. A first control unit for a vehicle, comprising:
a first evaluation circuit to generate an activation decision as a function of a sensor signal, wherein the activation decision is made in the first control unit and is comprised of at least two messages; and
a transmitting arrangement to transmit the at least two messages that includes the activation decision via a first interface for the activation decision, wherein the first control unit is set to an active state by the first message and the second message brings about the activation of the actuator system if the first control unit has been set to the active state.

7. The first control unit of claim 6, wherein the activation decision is used to activate a personal protective arrangement.

8. A control unit system for a vehicle, comprising:
a first control unit;
a first evaluation circuit to generate an activation decision as a function of a sensor signal, wherein the activation decision is made in the first control unit and is comprised of at least two messages;
a transmitting arrangement to transmit the at least two messages that includes the activation decision via a first interface for the activation decision;
a second control unit; and
a second evaluation circuit that activates an actuator system as a function of two messages that are provided by a second interface, wherein the second control unit is set to an active state by the first message and the second message brings about the activation of the actuator system if the second control unit has been set to the active state.

9. The second control unit of claim 8, wherein the second control unit is configured to activate at least one of an electronic stability program and a brake assist system.

10. A device for transmitting an activation decision, comprising:
a transmitting arrangement to transmit an activation decision for an actuator system from a first control unit to a second control unit, wherein the activation decision is made in the first control unit and is comprised of at least two messages, the second control unit activating the actuator system as a function of the at least two messages that includes the activation decision from the first control unit, wherein the second control unit is set to an active state by the first message and the second message brings about the activation of the actuator system if the second control unit has been set to the active state.

11. The device of claim 10, wherein the first control unit and the second control unit respectively control different vehicle systems.

12. A device for transmitting an activation decision, comprising:
a transmitting arrangement to transmit an activation decision for an actuator system from a first control unit to a second control unit, the second control unit activating the actuator system as a function of at least two messages from the first control unit;
wherein the first control unit is configured for activating a personal protective arrangement and the second control unit for activating at least one of an electronic stability program and a brake assist system.

13. A method for transmitting an activation decision, the method comprising:
transmitting an activation decision for an actuator system from a first control unit to at least one second control unit; and
activating the actuator system as a function of at least two messages from the first control unit;
wherein the first control unit activates a personal protective arrangement and the second control unit activates at least one of an electronic stability program and a brake system, wherein the second control unit is set to an active state by the first message and the second message brings about the activation of the actuator system if the second control unit has been set to the active state, and wherein the activation takes place when the second control unit receives at least two messages, the second message having been generated by a third message from the second control unit to the first control unit.

* * * * *